United States Patent
Chen et al.

(10) Patent No.: US 12,335,001 B2
(45) Date of Patent: Jun. 17, 2025

(54) METHOD FOR DETERMINING ANTENNA-PANEL SWITCHING, USER EQUIPMENT AND BASE STATION

(71) Applicant: DATANG MOBILE COMMUNICATIONS EQUIPMENT CO., LTD., Beijing (CN)

(72) Inventors: Runhua Chen, Beijing (CN); Hui Li, Beijing (CN); Yajuan Luo, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 434 days.

(21) Appl. No.: 17/798,505

(22) PCT Filed: Jan. 28, 2021

(86) PCT No.: PCT/CN2021/074105
§ 371 (c)(1),
(2) Date: Aug. 9, 2022

(87) PCT Pub. No.: WO2021/159963
PCT Pub. Date: Aug. 19, 2021

(65) Prior Publication Data
US 2023/0107768 A1   Apr. 6, 2023

(30) Foreign Application Priority Data
Feb. 10, 2020 (CN) .......................... 202010085342.3

(51) Int. Cl.
*H04B 7/06* (2006.01)
*H04B 7/08* (2006.01)
*H04W 24/02* (2009.01)

(52) U.S. Cl.
CPC ......... *H04B 7/0602* (2013.01); *H04B 7/0802* (2013.01); *H04W 24/02* (2013.01)

(58) Field of Classification Search
CPC .. H04B 7/0602; H04B 7/0802; H04B 7/0691; H04B 7/06956; H04B 7/0404; H04W 24/02
See application file for complete search history.

(56) References Cited

U.S. PATENT DOCUMENTS

| | | |
|---|---|---|
| 2010/0067588 A1 | 3/2010 | Takano |
| 2013/0070827 A1 | 3/2013 | Li |

(Continued)

FOREIGN PATENT DOCUMENTS

| | | |
|---|---|---|
| CN | 102299761 A | 12/2011 |
| CN | 103814530 A | 5/2014 |

(Continued)

OTHER PUBLICATIONS

LG Electronics: "Feature lead summary of Enhancements on Multi-beam Operations", 3GPP Draft; R1-1903686 R1#96, vol. RAN WG1, Athens, Greece; Mar. 3, 2019 (Year: 2019).*
Extended European Search Report for the corresponding European Patent Application No. 21753786.9 issued by the European Patent Office on Sep. 22, 2023.
"Feature lead summary of Enhancements on Multi-beam Operations," 3GPP TSG RAN WG1 Meeting #96, R1-1903686, Athens, Greece, Feb. 25-Mar. 1, 2019, Agenda item: 7.2.8.3 , Source: LG Electronics, all pages.

(Continued)

*Primary Examiner* — Yuwen Pan
*Assistant Examiner* — Swati Jain
(74) *Attorney, Agent, or Firm* — Ladas & Parry, LLP

(57) ABSTRACT

The present disclosure provides a method for determining antenna-panel switching, a user equipment and a base station. The method includes: determining antenna-panel switching indication information; and, performing antenna-panel switching according to the antenna-panel switching indication information.

11 Claims, 3 Drawing Sheets determining antenna-panel switching indication information — S210 performing antenna-panel switching according to the antenna-panel switching indication information — S220

(56) References Cited

U.S. PATENT DOCUMENTS

| | | | |
|---|---|---|---|
| 2018/0145742 A1* | 5/2018 | Li | H04B 7/0874 |
| 2019/0260456 A1 | 8/2019 | Zhou et al. | |
| 2020/0029274 A1* | 1/2020 | Cheng | H04W 76/28 |
| 2020/0067590 A1* | 2/2020 | Wang | H04B 7/0868 |
| 2021/0329673 A1* | 10/2021 | Gao | H04B 7/0404 |
| 2022/0173784 A1* | 6/2022 | Gao | H04B 7/0874 |
| 2022/0264643 A1* | 8/2022 | Li | H04L 5/0023 |
| 2023/0164585 A1* | 5/2023 | Li | H04W 72/232 370/329 |

FOREIGN PATENT DOCUMENTS

| | | | |
|---|---|---|---|
| CN | 107615676 A | | 1/2018 |
| CN | 109391307 A | | 2/2019 |
| CN | 109391308 A | | 2/2019 |
| CN | 109964418 A | | 7/2019 |
| CN | 110636441 A | | 12/2019 |
| WO | 2019061173 A1 | | 4/2019 |

OTHER PUBLICATIONS

Office Action for the corresponding European Patent Application No. 21753786.9 issued by the European Patent Office on Jul. 5, 2023.
International Search Report for PCT/CN2021/074105 issued on Apr. 19, 2021, and its English Translation provided by WIPO.
Written Opinion for PCT/CN2021/074105 issued on Apr. 19, 2021, and its English Translation provided by WIPO.
International Preliminary Report on Patentability for PCT/CN2021/074105 issued on Aug. 11, 2022, and its English Translation provided by WIPO.
First Office Action and search report for Chinese Patent Application 202010085342.3 issued on Apr. 12, 2022 and its English Translation provided by Global Dossier.

* cited by examiner

```
determining antenna-panel switching indication     S210
information performing antenna-panel switching according to the    S220
antenna-panel switching indication information
```

METHOD FOR DETERMINING ANTENNA-PANEL SWITCHING, USER EQUIPMENT AND BASE STATION

CROSS-REFERENCE TO RELATED APPLICATIONS

This application is the U.S. national phase of PCT Application PCT/CN2021/074105 filed on Jan. 28, 2021, which claims the priority of Chinese Application No. 202010085342.3, filed on Feb. 10, 2020, the disclosures of which are incorporated in their entireties by reference herein.

TECHNICAL FIELD

The present disclosure relates to the field of wireless technologies, and in particular, to a method for determining antenna-panel switching, user equipment and a base station.

BACKGROUND

In the related art, for an uplink transmission of user equipment with multiple antenna panels, a reference signal with good beam quality is selected by performing uplink or downlink reference signal beam sweeping, and then a beam direction of the uplink transmission is determined based on a beam direction of the reference signal.

In the related art, a base station cannot obtain antenna panel information of the user equipment, and cannot determine whether the user equipment has undergone antenna-panel switching. In order to ensure uplink transmission performance, the base station preferably needs to perform an uplink beam sweeping before each uplink transmission, or configure a periodic uplink channel sounding reference signal (SRS) for performing periodic uplink beam sweeping, to ensure upstream transmissions matching with antenna panels.

However, the above manners of performing an uplink beam sweeping before each uplink transmission or configuring a periodic uplink SRS for performing periodic uplink beam sweeping, will undoubtedly cause a larger system overhead, resulting in problems of low system performance.

SUMMARY

An object of the present disclosure is to provide a method for determining antenna-panel switching, a user equipment and a base station, which can solve the problem that a base station in the related art cannot obtain antenna panel information of user equipment, and performs an uplink beam sweeping before each uplink transmission or configures a periodic uplink SRS for performing periodic uplink beam sweeping, which causes high system overhead and low performance.

One embodiment of the present disclosure provides a method for determining antenna-panel switching, performed by user equipment, including:

determining antenna-panel switching indication information; and performing antenna-panel switching according to the antenna-panel switching indication information.

Optionally, the antenna-panel switching indication information includes at least one of a time range, a switching point or an offset.

Optionally, the antenna-panel switching indication information includes the time range, and the performing antenna-panel switching according to the antenna-panel switching indication information, includes:

within the time range indicated by the antenna-panel switching indication information, not performing antenna-panel switching.

Optionally, the antenna-panel switching indication information includes the switching point, and the performing antenna-panel switching according to the antenna-panel switching indication information, includes:

at the switching point indicated by the antenna-panel switching indication information, performing antenna-panel switching.

Optionally, the antenna-panel switching indication information includes the offset, and the performing antenna-panel switching according to the antenna-panel switching indication information, includes:

when a target event is detected, at a time point determined by adding the offset to a trigger time of the target event, performing antenna-panel switching.

Optionally, the target event includes at least one of the following:

target communication event;
system timing arrives;
a base station sends a first target signaling; or,
the user equipment sends a second target signaling.

Optionally, the antenna-panel switching indication information includes multiple switching points which are periodic and/or aperiodic.

Optionally, the determining antenna-panel switching indication information, includes at least one of the following:

obtaining the antenna-panel switching indication information indicated by a base station;

according to system predefined information, determining the antenna-panel switching indication information; or determining, by the user equipment itself, the antenna-panel switching indication information.

Optionally, when the user equipment itself determines the antenna-panel switching indication information, the method further includes:

reporting the antenna-panel switching indication information to the base station.

Optionally, the reporting the antenna-panel switching indication information to the base station, includes:

reporting the antenna-panel switching indication information to the base station, through an uplink channel or a triggered target communication event.

Optionally, before the user equipment reports the antenna-panel switching indication information to the base station, the method further includes:

sending a switching information configuration request to the base station;

receiving a configuration instruction sent by the base station according to the configuration request;

wherein the reporting the antenna-panel switching indication information to the base station, includes:

according to the configuration instruction, reporting the antenna-panel switching indication information to the base station.

Optionally, the obtaining the antenna-panel switching indication information indicated by the base station, includes:

obtaining the antenna-panel switching indication information sent by the base station through physical layer signaling or higher layer signaling; or, according to a target communication event triggered by the base station, obtaining the antenna-panel switching indication information.

Optionally, the target communication event includes at least one of the following:

one synchronization signal and PBCH block (SSB) beam transmission performing downlink beam measurement reporting;
beam failure reporting;
sending beam failure recovery request;
performing new beam reporting;
performing uplink beam sweeping;
sending content-based random access channel (RACH);
performing downlink beam sweeping;
using media access control control unit (MAC-CE) scheduled by downlink control information (DCI) to reconfigure signals;
responding to downlink beam failure;
receiving content-based RACH; or,
triggering a RACH with no content.

Another embodiment of the present disclosure provides a method for determining antenna-panel switching, performed by a base station, including:

determining antenna-panel switching indication information of user equipment;

determining, according to the antenna-panel switching indication information, whether the user equipment has performed antenna-panel switching.

Optionally, the antenna-panel switching indication information includes at least one of a time range, a switching point or an offset.

Optionally, the antenna-panel switching indication information includes the time range, and the determining, according to the antenna-panel switching indication information, whether the user equipment has performed antenna-panel switching, includes:

determining that the user equipment does not perform antenna-panel switching within the time range indicated by the antenna-panel switching indication information.

Optionally, the antenna-panel switching indication information includes the switching point, and the determining, according to the antenna-panel switching indication information, whether the user equipment has performed antenna-panel switching, includes:

determining whether the user equipment performs antenna-panel switching at the switching point indicated by the antenna-panel switching indication information.

Optionally, the antenna-panel switching indication information includes the offset, and the determining, according to the antenna-panel switching indication information, whether the user equipment has performed antenna-panel switching, includes:

determining that when the user equipment detects a target event, the user equipment performs antenna-panel switching at a time point determined by adding the offset to a trigger time of the target event.

Optionally, the target event includes at least one of the following:

target communication event;
system timing arrives;
the base station sends a first target signaling; or,
the user equipment sends a second target signaling.

Optionally, the antenna-panel switching indication information includes multiple switching points which are periodic and/or aperiodic.

Optionally, the determining antenna-panel switching indication information, includes at least one of the following:

obtaining the antenna-panel switching indication information reported by the user equipment;

according to system predefined information, determining the antenna-panel switching indication information; or, determining, by the base station itself, the antenna-panel switching indication information.

Optionally, the obtaining the antenna-panel switching indication information reported by the user equipment, includes:

obtaining the antenna-panel switching indication information reported by the user equipment to the base station through an uplink channel or a triggered target communication event.

Optionally, before obtaining the antenna-panel switching indication information reported by the user equipment, the method further includes:

obtaining switching information configuration request sent by the user equipment;

in response to the switching information configuration request, sending a configuration instruction to the user equipment, so that the user equipment reports the antenna-panel switching indication information to the base station, according to the configuration instruction.

Optionally, after the base station itself determines the antenna-panel switching indication information, the method further includes:

indicating the antenna-panel switching indication information to the user equipment.

Optionally, the indicating the antenna-panel switching indication information to the user equipment, includes:

indicating the antenna-panel switching indication information to the user equipment through physical layer signaling or high layer signaling; or indicating the antenna-panel switching indication information to the user equipment by triggering a target communication event.

Optionally, the target communication event includes at least one of the following:

one synchronization signal and PBCH block (SSB) beam transmission;
downlink beam measurement reporting;
beam failure reporting;
sending beam failure recovery request;
performing new beam reporting;
performing uplink beam sweeping;
sending content-based random access channel (RACH);
performing downlink beam sweeping;
using media access control control unit (MAC-CE) scheduled by downlink control information (DCI) to reconfigure signals;
responding to downlink beam failure;
receiving content-based RACH; or,
triggering a RACH with no content.

Another embodiment of the present disclosure provides a user equipment, including: a transceiver, a memory, a processor, and a program stored on the memory and executed by the processor; the processor is configured to, determining antenna-panel switching indication information; and performing antenna-panel switching according to the antenna-panel switching indication information.

Optionally, the antenna-panel switching indication information includes at least one of a time range, a switching point or an offset.

Optionally, the antenna-panel switching indication information includes the time range; when performing antenna-panel switching according to the antenna-panel switching indication information, the processor is configured to, within the time range indicated by the antenna-panel switching indication information, not perform antenna-panel switching.

Optionally, the antenna-panel switching indication information includes the switching point; when performing antenna-panel switching according to the antenna-panel switching indication information, the processor is configured to, at the switching point indicated by the antenna-panel switching indication information, perform antenna-panel switching.

Optionally, the antenna-panel switching indication information includes the offset; when performing antenna-panel switching according to the antenna-panel switching indication information, the processor is configured to, when a target event is detected, at a time point determined by adding the offset to a trigger time of the target event, perform antenna-panel switching.

Optionally, the target event includes at least one of the following:
  target communication event;
  system timing arrives;
  a base station sends a first target signaling; or,
  the user equipment sends a second target signaling.

Optionally, the antenna-panel switching indication information includes multiple switching points which are periodic and/or aperiodic.

Optionally, determining antenna-panel switching indication information, includes at least one of the following:
  obtaining the antenna-panel switching indication information indicated by a base station;
  according to system predefined information, determining the antenna-panel switching indication information; or,
  determining, by the user equipment itself, the antenna-panel switching indication information.

Optionally, when the user equipment itself determines the antenna-panel switching indication information, the processor is configured to,
  report the antenna-panel switching indication information to the base station.

Optionally, when reporting the antenna-panel switching indication information to the base station, the processor is configured to,
  report the antenna-panel switching indication information to the base station, through an uplink channel or a triggered target communication event.

Optionally, when obtaining the antenna-panel switching indication information indicated by the base station, the processor is configured to,
  obtain the antenna-panel switching indication information sent by the base station through physical layer signaling or higher layer signaling; or,
  according to a target communication event triggered by the base station, obtain the antenna-panel switching indication information.

Optionally, the target communication event includes at least one of the following:
  one synchronization signal and PBCH block (SSB) beam transmission
  performing downlink beam measurement reporting;
  beam failure reporting;
  sending beam failure recovery request;
  performing new beam reporting;
  performing uplink beam sweeping;
  sending content-based random access channel (RACH);
  performing downlink beam sweeping;
  using media access control control unit (MAC-CE) scheduled by downlink control information (DCI) to reconfigure signals;
  responding to downlink beam failure;
  receiving content-based RACH; or,
  triggering a RACH with no content.

Another embodiment of the present disclosure provides a base station, including: a transceiver, a memory, a processor, and a program stored on the memory and executed by the processor; the processor is configured to,
  determine antenna-panel switching indication information of user equipment;
  determine, according to the antenna-panel switching indication information, whether the user equipment has performed antenna-panel switching.

Optionally, the antenna-panel switching indication information includes at least one of a time range, a switching point or, an offset.

Optionally, the antenna-panel switching indication information includes the time range; when determining, according to the antenna-panel switching indication information, whether the user equipment has performed antenna-panel switching, the processor is configured to,
  determine that the user equipment does not perform antenna-panel switching within the time range indicated by the antenna-panel switching indication information.

Optionally, the antenna-panel switching indication information includes the switching point; when determining, according to the antenna-panel switching indication information, whether the user equipment has performed antenna-panel switching, the processor is configured to,
  determine whether the user equipment performs antenna-panel switching at the switching point indicated by the antenna-panel switching indication information.

Optionally, the antenna-panel switching indication information includes the offset; when determining, according to the antenna-panel switching indication information, whether the user equipment has performed antenna-panel switching, the processor is configured to,
  determine that when the user equipment detects a target event, the user equipment performs antenna-panel switching at a time point determined by adding the offset to a trigger time of the target event.

Optionally, the target event includes at least one of the following:
  target communication event;
  system timing arrives;
  the base station sends a first target signaling; or,
  the user equipment sends a second target signaling.

Optionally, the antenna-panel switching indication information includes multiple switching points which are periodic and/or aperiodic.

Optionally, when determining antenna-panel switching indication information, the processor is configured to perform at least one of the following:
  obtaining the antenna-panel switching indication information reported by the user equipment;
  according to system predefined information, determining the antenna-panel switching indication information; or,
  determining, by the base station itself, the antenna-panel switching indication information.

Optionally, when obtaining the antenna-panel switching indication information reported by the user equipment, the processor is configured to perform:

obtaining the antenna-panel switching indication information reported by the user equipment to the base station through an uplink channel or a triggered target communication event.

Optionally, before obtaining the antenna-panel switching indication information reported by the user equipment, the processor is configured to perform:

obtaining switching information configuration request sent by the user equipment;

in response to the switching information configuration request, sending a configuration instruction to the user equipment, so that the user equipment reports the antenna-panel switching indication information to the base station, according to the configuration instruction.

Optionally, after the base station itself determines the antenna-panel switching indication information, the processor is configured to perform:

indicating the antenna-panel switching indication information to the user equipment.

Optionally, when indicating the antenna-panel switching indication information to the user equipment, the processor is configured to perform:

indicating the antenna-panel switching indication information to the user equipment through physical layer signaling or high layer signaling; or indicating the antenna-panel switching indication information to the user equipment by triggering a target communication event.

Optionally, the target communication event includes at least one of the following:

one synchronization signal and PBCH block (SSB) beam transmission;

downlink beam measurement reporting;

beam failure reporting;

sending beam failure recovery request;

performing new beam reporting;

performing uplink beam sweeping;

sending content-based random access channel (RACH);

performing downlink beam sweeping;

using media access control control unit (MAC-CE) scheduled by downlink control information (DCI) to reconfigure signals;

responding to downlink beam failure;

receiving content-based RACH; or, triggering a RACH with no content.

Another embodiment of the present disclosure provides a device for determining antenna-panel switching, which is applied to user equipment, including:

a first determining module configured to determine antenna-panel switching indication information; and a first processing module configured to perform antenna-panel switching according to the antenna-panel switching indication information.

Another embodiment of the present disclosure provides a device for determining antenna-panel switching, which is applied to a base station, including:

a second determining module configured to determine antenna-panel switching indication information of user equipment; and a second processing module configured to determine, according to the antenna-panel switching indication information, whether the user equipment has performed antenna-panel switching.

Another embodiment of the present disclosure provides a processor-readable storage medium, including a program stored thereon; wherein the program is executed by a processor to implement the foregoing method.

The foregoing technical solutions of the present disclosure have at least the following beneficial effects:

a base station can determine, according to the antenna-panel switching indication information, whether the user equipment has performed antenna-panel switching, thereby enabling the base station to use an antenna panel, which matches an antenna panel of the user equipment, for data transmission, and then avoiding the problem of excessive system overhead, and thus improving the system performance.

According to the method for determining antenna-panel switching described in the foregoing embodiment of the present disclosure, the base station can determine, according to the antenna-panel switching indication information, whether the user equipment has performed antenna-panel switching, thereby enabling the base station to use an antenna panel, which matches an antenna panel of the user equipment, for data transmission, and then avoiding the problem of excessive system overhead, and thus improving the system performance.

DETAILED DESCRIPTION

In order to make the technical problems to be solved, the technical solutions, and the advantages of the present disclosure more apparent, the present disclosure will be described in details hereinafter in conjunction with the drawings and embodiments.

Figures 1, 2:
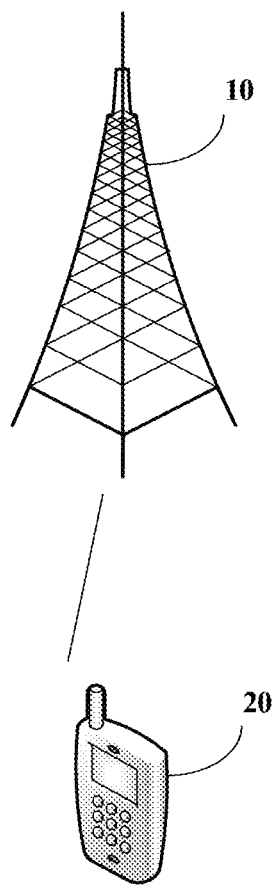
FIG. 1 is a schematic diagram of a system architecture to which a method according to an embodiment of the present disclosure can be applied.
FIG. 2 is a schematic flowchart of a method according to an embodiment of the present disclosure.

A method for determining antenna-panel switching, a user equipment and a base station provided in the embodiments of the present disclosure can be applied to a wireless communication system. The wireless communication system may adopt a fifth-generation (5G) system, an evolved long-term evolution (eLTE) system, or a subsequent evolved communication system. Referring to FIG. 1, it is a schematic diagram of a wireless communication system according to an embodiment of the present disclosure. As shown in FIG. 1, the wireless communication system may include a base station 10 and a user equipment 20. A connection actually applied between the base station 10 and the user equipment 20 may be a wireless connection. In order to conveniently and intuitively represent connection relationship between various devices, a solid line is used for illustration in FIG. 1.

It should be noted that the forgoing communication system may include multiple user equipment 20, and the base station may communicate with multiple user equipment (to transmit signaling or transmit data).

In the embodiments of the present disclosure, the base station 10 may be a commonly used base station, an evolved node base station (eNB), or a network device in a 5G system (such as a next generation node base station (gNB), a transmission and reception point (TRP), or a cell).

In the embodiments of the present disclosure, the user equipment 20 may be a mobile phone, a tablet computer, a notebook computer, an ultra-mobile personal computer (UMPC), a netbook, or a personal digital assistant (PDA), etc.

In order to solve the problem that a base station in the related art cannot obtain antenna panel information of user equipment, and performs an uplink beam sweeping before each uplink transmission or configures a periodic uplink SRS for performing periodic uplink beam sweeping, which causes high system overhead and low performance, one embodiment of the present disclosure provides a method for determining antenna-panel switching, which introduces antenna-panel switching indication information, so that a user equipment can perform antenna-panel switching according to the antenna-panel switching indication information, and a base station can determine, according to the antenna-panel switching indication information, whether the user equipment has performed antenna-panel switching, thereby enabling the base station to use an antenna panel, which matches an antenna panel of the user equipment, for data transmission, and then avoiding the problem of excessive system overhead, and thus improving the system performance.

One embodiment of the present disclosure provides a method for determining antenna-panel switching, which is applied to a user equipment. As shown in FIG. 2, the method includes:

S210: determining antenna-panel switching indication information;

S220: performing antenna-panel switching according to the antenna-panel switching indication information.

According to the method for determining antenna-panel switching described in the foregoing embodiment, by introducing the antenna-panel switching indication information, the user equipment can perform antenna-panel switching according to the antenna-panel switching indication information.

In one implementation of the embodiments of the present disclosure, the antenna-panel switching indication information includes at least one of a time range, a switching point or an offset.

Optionally, in one implementation, when the antenna-panel switching indication information includes a time range, the performing antenna-panel switching according to the antenna-panel switching indication information in the step S220 includes:

within the time range indicated by the antenna-panel switching indication information, not performing antenna-panel switching.

Optionally, in other implementation, when the antenna-panel switching indication information includes a switching point, the performing antenna-panel switching according to the antenna-panel switching indication information in the step S220 includes:

at the switching point indicated by the antenna-panel switching indication information, performing antenna-panel switching.

The switching point may be a time point, but is not limited to being a time point, for example, the switching point may also be a trigger event. In this embodiment, the user equipment can perform antenna-panel switching at the switching point indicated by the antenna-panel switching indication information, so that the user equipment can use different antenna panels before and after a moment corresponding to the switching point. Further, the antenna-panel switching indication information may indicate one or at least two switching points. When the antenna-panel switching indication information indicates at least two switching points, the user equipment can perform antenna-panel switching at each switching point according to the indicated switching points. During a time period between moments corresponding to two adjacent switching points, the user equipment may use an identical antenna panel, and does not perform switching.

Further, when the antenna-panel switching indication information includes switching points, the antenna-panel switching indication information may include multiple switching points which are periodic and/or aperiodic.

For example, the switching points included in the determined antenna-panel switching indication information may include: T0, T1, T2, ..., Tn, and the n switching points may be periodic or aperiodic.

With this embodiment, during the time period between the moments corresponding to two adjacent switching points, the user equipment may use an identical antenna panel, and does not perform switching.

Optionally, in another implementation, when the antenna-panel switching indication information includes an offset, the performing antenna-panel switching according to the antenna-panel switching indication information in the step S220 includes:

when a target event is detected, at a time point determined by adding the offset to a trigger time of the target event, performing antenna-panel switching.

The target event includes at least one of the following:
target communication event;
system timing arrives;
the base station sends a first target signaling; or,
the user equipment sends a second target signaling.

For example, the antenna-panel switching indication information may indicate switching points of multiple periods by indicating a period T. In addition, the antenna-panel switching indication information may further include an offset Δ. According to the indicated period T and offset Δ, switching points are finally determined as: T0=Δ, T1=T+Δ, T2=2T+Δ, ..., Tn=nT+Δ.

For another example, the antenna-panel switching indication information may include only the offset Δ, when the user equipment detects a target communication event, or system timing arrives, or the base station sends a first target signaling, or the user equipment sends a second target signaling, on the basis of a determined trigger time point, a time point determined by adding the offset Δ to the determined trigger time point is determined as a switching point.

In the embodiment of the present disclosure, the target communication event is an event executed during data transmission between the base station and the user equipment.

Optionally, the target communication event includes:
one synchronization signal and PBCH block (SSB) beam transmission;
downlink beam measurement reporting;
beam failure reporting;
sending beam failure recovery request;
performing new beam reporting;
performing uplink beam sweeping;
sending content-based random access channel (RACH);
performing downlink beam sweeping;

using media access control control unit (MAC-CE) scheduled by downlink control information (DCI) to reconfigure signals;
responding to downlink beam failure;
receiving content-based RACH;
triggering a RACH with no content.

In the embodiment of the present disclosure, the determining antenna-panel switching indication information in the step S210, includes:
obtaining the antenna-panel switching indication information indicated by the base station;
according to system predefined information, determining the antenna-panel switching indication information;
determining, by the user equipment itself, the antenna-panel switching indication information.

In one embodiment, when the user equipment itself determines the antenna-panel switching indication information in the step S210, the method further includes: reporting the antenna-panel switching indication information to the base station.

Optionally, the reporting the antenna-panel switching indication information to the base station, includes:
reporting the antenna-panel switching indication information to the base station, through an uplink channel or a triggered target communication event.

In the foregoing embodiment, when the user equipment reports the antenna-panel switching indication information to the base station through the triggered target communication event, the antenna-panel switching indication information triggered by the user equipment is associated with a specific event triggered by the user equipment.

Optionally, the target communication event includes at least one of the following:
one synchronization signal and PBCH block (SSB) beam transmission;
downlink beam measurement reporting;
beam failure reporting;
beam failure recovery request;
performing new beam reporting;
performing uplink beam sweeping; or,
sending content-based random access channel (RACH).

Optionally, in one embodiment, before the user equipment reports the antenna-panel switching indication information to the base station, the method further includes:
sending a switching information configuration request to the base station;
receiving a configuration instruction sent by the base station according to the configuration request.

Optionally, the reporting the antenna-panel switching indication information to the base station in the step S210, includes:
according to the configuration instruction, reporting the antenna-panel switching indication information to the base station.

In this embodiment, the user equipment sends a switching information configuration request to the base station to request the base station to configure, for the user equipment, transmission resource for reporting the antenna-panel switching indication information. According to the configuration request, the base station sends a configuration instruction to the user equipment, so that the user equipment can report the antenna-panel switching indication information according to the configuration instruction.

Optionally, after receiving the switching information configuration request sent by the user equipment, in response to the switching information configuration request, the base station may send a configuration instruction to the user equipment to instruct the user equipment to use physical uplink shared channel (PUSCH), physical uplink control channel (PUCCH) or physical random access channel (PRACH) to report the antenna-panel switching indication information.

In the embodiment of the present disclosure, when the determining antenna-panel switching indication information in the step S210 includes: obtaining the antenna-panel switching indication information indicated by the base station and determine the antenna-panel switching indication information according to system predefined information, the system predefined information may include multiple trigger events, and the trigger events include at least one of the following:
one synchronization signal and PBCH block (SSB) beam transmission
the user equipment performing downlink beam measurement reporting;
beam failure reporting;
beam failure recovery request;
performing new beam reporting;
performing uplink beam sweeping;
sending content-based random access channel (RACH);
performing downlink beam sweeping;
using media access control control unit (MAC-CE) scheduled by downlink control information (DCI) to reconfigure signals;
responding to downlink beam failure;
receiving content-based RACH; or,
triggering a RACH with no content.

In the step S210 of determining antenna-panel switching indication information according to another implementation, the obtaining the antenna-panel switching indication information indicated by the base station, includes:
obtaining the antenna-panel switching indication information sent by the base station through physical layer signaling or higher layer signaling; or,
according to a target communication event triggered by the base station, obtaining the antenna-panel switching indication information.

Optionally, the physical layer signaling includes DCI signaling, and the higher layer signaling includes radio resource control (RRC) signaling and/or MAC-CE signaling.

Optionally, the target communication event includes at least one of the following:
performing downlink beam sweeping;
using media access control control unit (MAC-CE) scheduled by downlink control information (DCI) to reconfigure signals;
responding to downlink beam failure;
receiving content-based RACH; or,
triggering a RACH with no content.

In the above embodiment, when the base station indicates the antenna-panel switching indication information to the user equipment by triggering the target communication event, the antenna-panel switching indication information triggered by the base station is associated with a specific event triggered by the base station.

Specific applications of the method for determining antenna-panel switching according to the embodiments of the present disclosure will be described hereinafter with examples.

Example One

It is assumed that user equipment has two antenna panels, which are denoted as panel-ID0 and panel-ID1, respectively.

In one embodiment, the user equipment determines antenna-panel switching indication information. The antenna-panel switching indication information includes a switching period T. One switching period T is corresponding to a time range, and is used to indicate that panel switching is not performed within one switching period T. Optionally, the switching period T may be reported via a terminal capability; or, after the user equipment sends a switching information configuration request to the base station, the base station allocates, according to the configuration request, uplink channel resources to the user equipment through a configuration instruction, and instructs the user equipment to report the switching period T through the allocated uplink channel resources.

In this embodiment, within one switching period T indicated by the antenna-panel switching indication information, the user equipment uses an identical panel to transmit uplink signals, such as using the panel-ID0 for transmission. At the beginning of the next cycle, the base station considers that the user equipment may switch panels (i.e., using the panel-ID1 for transmission), and then performs uplink beam sweeping. With this implementation, the base station only performs uplink beam sweeping once in each cycle, which can reduce the frequency of beam sweeping and then reduce overhead.

Example Two

In this embodiment, a base station sends antenna-panel switching indication information to user equipment. Optionally, the base station may indicate the antenna-panel switching indication information by indicating a switching period T. The antenna-panel switching indication information may be indicated through high-level signaling (such as RRC, MAC-CE) or physical layer DCI signaling.

Optionally, when the physical layer DCI signaling is used to indicate the antenna-panel switching indication information, a new DCI field can be defined to clearly indicate the switching period T of panel switching; or, a DCI field in related art can be reused, and such DCI field can be defined as an indication field of the antenna-panel switching indication information, for indicating the switching period T; or, the switching period T is related to the newly defined DCI field or the existing DCI field. For example, the switching period T is related to a time domain resource allocation field in DCI 0-1, and is used to indicate that the user equipment is not allowed to perform panel switching during transmission of PUSCH scheduled in this time domain resource.

Example Three

In this embodiment, in one implementation, antenna-panel switching indication information may be predefined by the system. The antenna-panel switching indication information includes multiple switching points T0, T1, T2, . . . , Tn.

The user equipment and the base station determine the multiple switching points T0, T1, T2, . . . , Tn, according to the system predefinition. At moments before and after each switching point, the user equipment can use different antenna panels for uplink data transmission. Between two switching points, the user equipment uses an identical antenna panel for uplink data transmission. For example, between switching points T0 and T1, the user equipment uses the same antenna panel for transmission.

Example Four

In this embodiment, in one implementation, multiple switching points may be periodic, and switching points indicated by antenna-panel switching indication information may be represented by a period T and an offset $\Delta$. In this implementation, the period T and the offset $\Delta$ may be configured by the base station, and the base station sends the antenna-panel switching indication information including the period T and the offset $\Delta$ to the user equipment.

Optionally, the base station may send the antenna-panel switching indication information to the user equipment through DCI or MAC-CE indication information.

Based on this, the switching points indicated by the antenna-panel switching indication information are:

T0=$\Delta$, T1=T+$\Delta$, T2=2T+$\Delta$, . . . , Tn=nT+$\Delta$.

Example Five

In this embodiment, in one implementation, the switching points T0, T1, T2, . . . , Tn indicated by the antenna-panel switching indication information may be aperiodic, and the user equipment and the base station may determine these switching points according to system predefined events. The system predefined events are as described above, and will not be described in detail here.

Example Six

In this embodiment, the switching point indicated in the antenna-panel switching indication information is an offset $\delta$ from a moment when the user equipment sends a switching information configuration request to the base station.

For example, when the user equipment sends a switching information configuration request to the base station at a moment Tr, then, a moment corresponding to the switching point is T0=Tr+$\delta$. In one implementation, the user equipment may report to the base station, only the antenna-panel switching indication information which includes only the offset $\delta$.

Optionally, in one implementation, the user equipment sends a switching information configuration request to the base station; in response to the switching information configuration request, the base station instructs the user equipment to report the above antenna-panel switching indication information through PUSCH, PUCCH or PRACH.

According to the method for determining antenna-panel switching described in the foregoing embodiment of the present disclosure, by introducing the antenna-panel switching indication information, the user equipment can perform antenna-panel switching according to the antenna-panel switching indication information.

Figure 3:
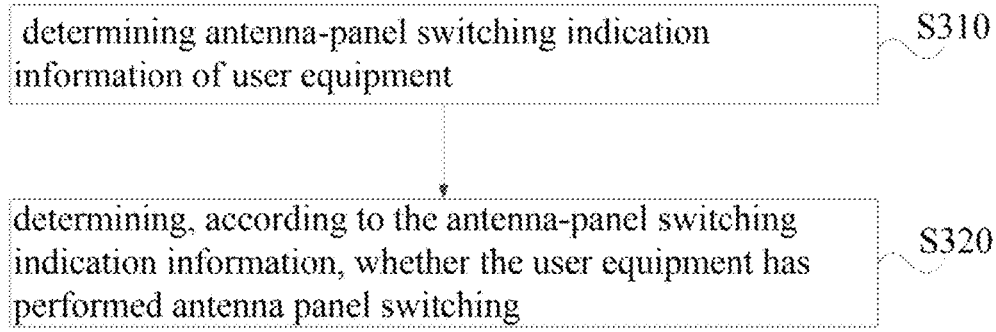
FIG. 3 is a schematic flowchart of a method according to another embodiment of the present disclosure.

One embodiment of the present disclosure further provides a method for determining antenna-panel switching, which is applied to a base station. As shown in FIG. 3, the method includes:

S310: determining antenna-panel switching indication information of user equipment;

S320: determining, according to the antenna-panel switching indication information, whether the user equipment has performed antenna-panel switching.

According to the method for determining antenna-panel switching described in the foregoing embodiment of the present disclosure, by introducing the antenna-panel switching indication information, the base station can determine, according to the antenna-panel switching indication information, whether the user equipment has performed antenna-panel switching, thereby enabling the base station to use an antenna panel, which matches an antenna panel of the user equipment, for data transmission, and then avoiding the problem of excessive system overhead, and thus improving the system performance.

Optionally, in the steps S310 and S320, the antenna-panel switching indication information includes at least one of a time range, a switching point or an offset.

Optionally, when the antenna-panel switching indication information includes a time range, the determining, according to the antenna-panel switching indication information, whether the user equipment has performed antenna-panel switching in the step S320, includes:

determining that the user equipment does not perform antenna-panel switching within the time range indicated by the antenna-panel switching indication information.

Optionally, when the antenna-panel switching indication information includes a switching point, the determining, according to the antenna-panel switching indication information, whether the user equipment has performed antenna-panel switching in the step S320, includes:

determining whether the user equipment performs antenna-panel switching at the switching point indicated by the antenna-panel switching indication information.

Optionally, it is determined that the user equipment uses different antenna panels before and after the switching point.

Optionally, when the antenna-panel switching indication information includes an offset, the determining, according to the antenna-panel switching indication information, whether the user equipment has performed antenna-panel switching in the step S320, includes:

determining that when the user equipment detects a target event, the user equipment performs antenna-panel switching at a time point determined by adding the offset to a trigger time of the target event.

Optionally, the target event includes at least one of the following:
    target communication event;
    system timing arrives;
    the base station sends a first target signaling; or,
    the user equipment sends a second target signaling.

Optionally, the antenna-panel switching indication information may include multiple switching points which are periodic and/or aperiodic.

Optionally, the determining antenna-panel switching indication information in the step S310, includes at least one of the following:
    obtaining the antenna-panel switching indication information reported by the user equipment;
    according to system predefined information, determining the antenna-panel switching indication information; or,
    determining, by the base station itself, the antenna-panel switching indication information.

In one implementation, when the user equipment reports the antenna-panel switching indication information, the obtaining the antenna-panel switching indication information reported by the user equipment, includes:
    obtaining the antenna-panel switching indication information reported by the user equipment to the base station through an uplink channel or a triggered target communication event.

Optionally, in the foregoing embodiment, before obtaining the antenna-panel switching indication information reported by the user equipment, the method further includes:
    obtaining switching information configuration request sent by the user equipment;
    in response to the switching information configuration request, sending a configuration instruction to the user equipment.

The user equipment reports the antenna-panel switching indication information to the base station, according to the configuration instruction.

Optionally, in one implementations, when the base station itself determines the antenna-panel switching indication information, after the base station itself determines the antenna-panel switching indication information, the method further includes:

indicating the antenna-panel switching indication information to the user equipment.

Optionally, in the foregoing implementation, the indicating the antenna-panel switching indication information to the user equipment, includes:
    indicating the antenna-panel switching indication information to the user equipment through physical layer signaling or high layer signaling; or
    indicating the antenna-panel switching indication information to the user equipment by triggering a target communication event.

Optionally, the target communication event includes at least one of the following:
    one synchronization signal and PBCH block (SSB) beam transmission;
    downlink beam measurement reporting;
    beam failure reporting;
    sending beam failure recovery request;
    performing new beam reporting;
    performing uplink beam sweeping;
    sending content-based random access channel (RACH);
    performing downlink beam sweeping;
    using media access control control unit (MAC-CE) scheduled by downlink control information (DCI) to reconfigure signals;
    responding to downlink beam failure;
    receiving content-based RACH; or,
    triggering a RACH with no content.

Figure 4:
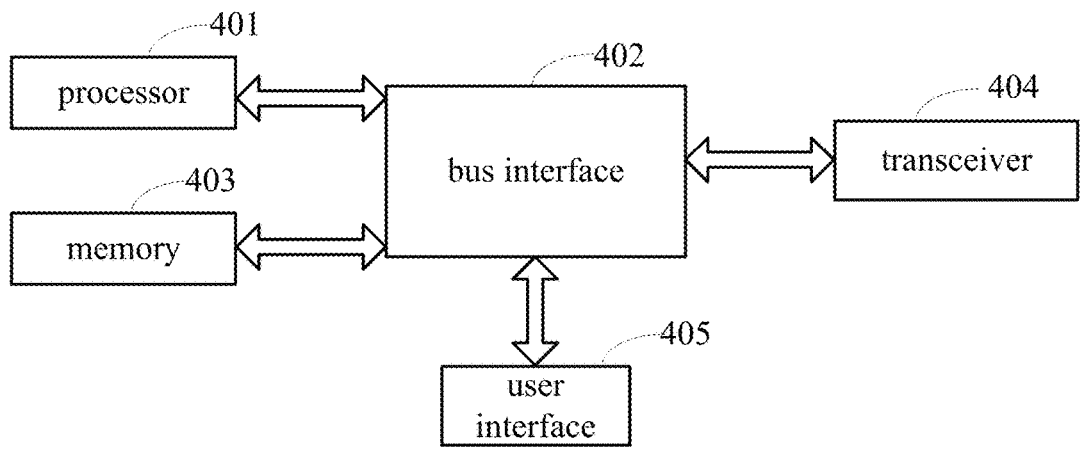
FIG. 4 is a schematic diagram of a user equipment according to an embodiment of the present disclosure.

One embodiment of the present disclosure further provides a user equipment. As shown in FIG. 4, the user equipment includes: a processor 401; a memory 403 coupled to the processor 401 through a bus interface 402, where the memory 403 is configured to store programs and data used by the processor 401 for performing operations; a transceiver 404 coupled to the bus interface 402 and configured to receive and send data under the control of the processor 401.

The processor 401 calls and executes the programs and data stored in the memory 403 to implement the following procedures:
    determining antenna-panel switching indication information;
    performing antenna-panel switching according to the antenna-panel switching indication information.

Optionally, the antenna-panel switching indication information includes at least one of a time range, a switching point or an offset.

Optionally, in case that the antenna-panel switching indication information includes a time range, when performing antenna-panel switching according to the antenna-panel switching indication information, the processor 401 is configured to,
    within the time range indicated by the antenna-panel switching indication information, not perform antenna-panel switching.

Optionally, in case that the antenna-panel switching indication information includes a switching point, when performing antenna-panel switching according to the antenna-panel switching indication information, the processor 401 is configured to,
    at the switching point indicated by the antenna-panel switching indication information, perform antenna-panel switching.

Optionally, in case that the antenna-panel switching indication information includes an offset, when performing antenna-panel switching according to the antenna-panel switching indication information, the processor 401 is configured to, when a target event is detected, at a time point determined by adding the offset to a trigger time of the target event, perform antenna-panel switching.

Optionally, the target event includes at least one of the following:
target communication event;
system timing arrives;
the base station sends a first target signaling; or,
the user equipment sends a second target signaling.

Optionally, the antenna-panel switching indication information may include multiple switching points which are periodic and/or aperiodic.

Optionally, the determining, by the user equipment, antenna-panel switching indication information, includes at least one of the following:
obtaining the antenna-panel switching indication information indicated by the base station;
according to system predefined information, determining the antenna-panel switching indication information; or,
determining, by the user equipment itself, the antenna-panel switching indication information.

Optionally, when determining, by the user equipment itself, the antenna-panel switching indication information, the processor 401 is configured to,
report the antenna-panel switching indication information to the base station.

Optionally, when reporting the antenna-panel switching indication information to the base station, the processor 401 is configured to,
report the antenna-panel switching indication information to the base station, through an uplink channel or a triggered target communication event.

Optionally, before the user equipment reports the antenna-panel switching indication information to the base station, the processor 401 is configured to,
send a switching information configuration request to the base station;
receive a configuration instruction sent by the base station according to the configuration request.

The reporting the antenna-panel switching indication information to the base station, includes:
according to the configuration instruction, reporting the antenna-panel switching indication information to the base station.

Optionally, when obtaining the antenna-panel switching indication information indicated by the base station, the processor 401 is configured to,
obtaining the antenna-panel switching indication information sent by the base station through physical layer signaling or higher layer signaling; or,
according to a target communication event triggered by the base station, obtaining the antenna-panel switching indication information.

Optionally, the target communication event includes:
one synchronization signal and PBCH block (SSB) beam transmission;
downlink beam measurement reporting;
beam failure reporting;
sending beam failure recovery request;
performing new beam reporting;
performing uplink beam sweeping;
sending content-based random access channel (RACH);
performing downlink beam sweeping;
using media access control control unit (MAC-CE) scheduled by downlink control information (DCI) to reconfigure signals;
responding to downlink beam failure;
receiving content-based RACH;
triggering a RACH with no content.

It should be noted that, in FIG. 4, the bus architecture may include any number of interconnected bus and bridge. Specifically, various circuits of one or more processors, which are represented by the processor 401, and one or more memories, which are represented by the memory 403, are linked together. The bus architecture may link various other circuits, such as a peripheral device, voltage regulator and a power management circuit together. These features are well known in this field, therefore, this disclosure does not make further description on these features. The bus interface provides an interface. The transceiver 404 may be multiple elements, including a transmitter and a receiver and provide units, which communicate with other devices on the transmission medium. For different user equipment, the user interface 405 may also be an interface capable of externally/internally connecting with the required devices, the connected devices including but not limited to a keypad, a display, a speaker, a microphone, and a joystick. The processor 401 is responsible for managing bus architecture and general processing. The memory 403 may store data used by the processor 401 when executing operations.

Those skilled in the art can understand that all or part of the steps in the foregoing embodiments may be implemented by hardware, or by instructing relevant hardware through a computer program. The computer program includes instructions for executing part or all of the steps of the above method. The computer program may be stored in a readable storage medium, and the storage medium may be any form of storage medium.

Figure 5:
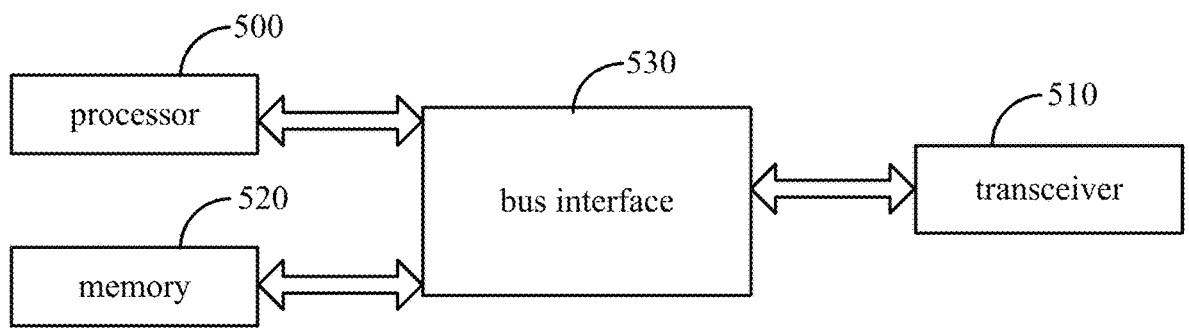
FIG. 5 is a schematic diagram of a base station according to an embodiment of the present disclosure.

One embodiment of the present disclosure further provides a network device. As shown in FIG. 5, the network device includes: a processor 500; a memory 520 coupled to the processor 500 through a bus interface 530; and a transceiver 510 coupled to the processor 500 via a bus interface. The memory 520 is configured to store programs and data used by the processor for performing operations. Data information or pilot is sent through the transceiver 510. An uplink control channel is also received through the transceiver 510. The processor 500 reads the programs stored in the memory 520 to implement the following procedures:
determining antenna-panel switching indication information of user equipment;
determining, according to the antenna-panel switching indication information, whether the user equipment has performed antenna-panel switching.

Optionally, the antenna-panel switching indication information includes at least one of a time range, a switching point or an offset.

Optionally, in case that the antenna-panel switching indication information includes a time range, when determining, according to the antenna-panel switching indication information, whether the user equipment has performed antenna-panel switching, the processor 500 is configured to,
determine that the user equipment does not perform antenna-panel switching within the time range indicated by the antenna-panel switching indication information.

Optionally, in case that the antenna-panel switching indication information includes a switching point, when determining, according to the antenna-panel switching indication information, whether the user equipment has performed antenna-panel switching, the processor 500 is configured to, determine whether the user equipment performs antenna-panel switching at the switching point indicated by the antenna-panel switching indication information.

Optionally, in case that the antenna-panel switching indication information includes an offset, when determining, according to the antenna-panel switching indication information, whether the user equipment has performed antenna-panel switching, the processor 500 is configured to, determine that when the user equipment detects a target event, the user equipment performs antenna-panel switching at a time point determined by adding the offset to a trigger time of the target event.

Optionally, the target event includes at least one of the following:

target communication event;
system timing arrives;
the base station sends a first target signaling; or,
the user equipment sends a second target signaling.

Optionally, the antenna-panel switching indication information may include multiple switching points which are periodic and/or aperiodic.

Optionally, when determining antenna-panel switching indication information, the processor 500 is configured to perform at least one of the following:

obtaining the antenna-panel switching indication information reported by the user equipment;

according to system predefined information, determining the antenna-panel switching indication information; or, determining, by the base station itself, the antenna-panel switching indication information.

Optionally, when obtaining the antenna-panel switching indication information reported by the user equipment, the processor 500 is configured to, obtain the antenna-panel switching indication information reported by the user equipment to the base station through an uplink channel or a triggered target communication event.

Optionally, before obtaining the antenna-panel switching indication information reported by the user equipment, the processor 500 is configured to, obtain switching information configuration request sent by the user equipment;

in response to the switching information configuration request, sending a configuration instruction to the user equipment.

The user equipment reports the antenna-panel switching indication information to the base station, according to the configuration instruction.

Optionally, after the base station itself determines the antenna-panel switching indication information, the processor 500 is configured to, indicate the antenna-panel switching indication information to the user equipment.

Optionally, when indicating the antenna-panel switching indication information to the user equipment, the processor 500 is configured to, indicate the antenna-panel switching indication information to the user equipment through physical layer signaling or high layer signaling; or indicate the antenna-panel switching indication information to the user equipment by triggering a target communication event.

Optionally, the target communication event includes at least one of the following:

one synchronization signal and PBCH block (SSB) beam transmission;

downlink beam measurement reporting;
beam failure reporting;
sending beam failure recovery request;
performing new beam reporting;
performing uplink beam sweeping;
sending content-based random access channel (RACH);
performing downlink beam sweeping;
using media access control control unit (MAC-CE) scheduled by downlink control information (DCI) to reconfigure signals;
responding to downlink beam failure;
receiving content-based RACH; or,
triggering a RACH with no content.

In addition, in FIG. 5, the bus architecture may include any number of interconnected bus and bridge. Specifically, various circuits of one or more processors, which are represented by the processor 500, and one or more memories, which are represented by the memory 520, are linked together. The bus architecture may link various other circuits, such as a peripheral device, voltage regulator and a power management circuit together. These features are well known in this field, therefore, this disclosure does not make further description on these features. The bus interface provides an interface. The transceiver 510 may be multiple elements, including a transmitter and a receiver and provide units, which communicate with other devices on the transmission medium. The processor 500 is responsible for managing bus architecture and general processing. The memory 520 may store data used by the processor 500 when executing operations.

Figure 6:
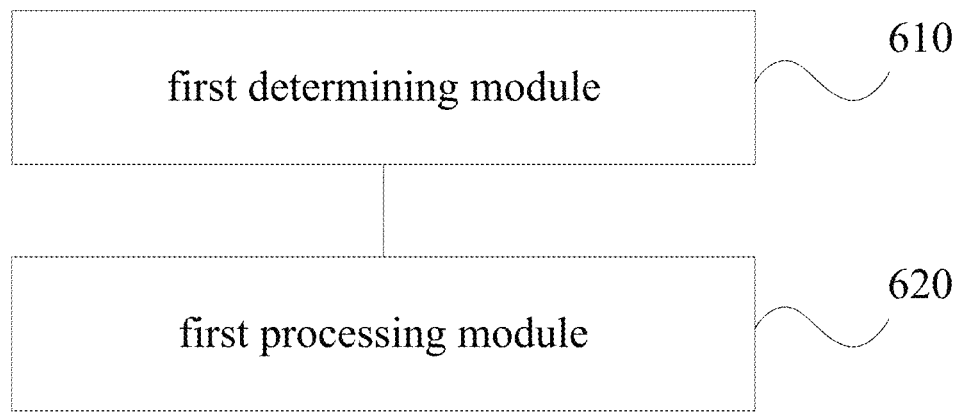
FIG. 6 is a schematic diagram of a device according to an embodiment of the present disclosure.

One embodiment of the present disclosure further provides a device for determining antenna-panel switching, which is applied to user equipment. As shown in FIG. 6, the device includes:

a first determining module 610 configured to determine antenna-panel switching indication information;

a first processing module 620 configured to perform antenna-panel switching according to the antenna-panel switching indication information.

Optionally, the antenna-panel switching indication information includes at least one of a time range, a switching point or an offset.

Optionally, in case that the antenna-panel switching indication information includes a time range, when performing antenna-panel switching according to the antenna-panel switching indication information, the first processing module 620 is configured to, within the time range indicated by the antenna-panel switching indication information, not perform antenna-panel switching.

Optionally, in case that the antenna-panel switching indication information includes a switching point, when performing antenna-panel switching according to the antenna-panel switching indication information, the first processing module 620 is configured to, at the switching point indicated by the antenna-panel switching indication information, perform antenna-panel switching.

Optionally, in case that the antenna-panel switching indication information includes an offset, when performing antenna-panel switching according to the antenna-panel switching indication information, the first processing module 620 is configured to, when a target event is detected, at a time point determined by adding the offset to a trigger time of the target event, perform antenna-panel switching.

Optionally, the target event includes at least one of the following:
    target communication event;
    system timing arrives;
    the base station sends a first target signaling; or,
    the user equipment sends a second target signaling.

Optionally, the antenna-panel switching indication information may include multiple switching points which are periodic and/or aperiodic.

Optionally, when determining antenna-panel switching indication information, the first determining module 610 is configured to perform at least one of the following:
    obtaining the antenna-panel switching indication information indicated by the base station;
    according to system predefined information, determining the antenna-panel switching indication information; or,
    determining, by the user equipment itself, the antenna-panel switching indication information.

Optionally, when determining, by the first determining module 610 itself, the antenna-panel switching indication information, the first processing module 620 is configured to,
    report the antenna-panel switching indication information to the base station.

Optionally, when reporting the antenna-panel switching indication information to the base station, the first processing module 620 is configured to,
    report the antenna-panel switching indication information to the base station, through an uplink channel or a triggered target communication event.

Optionally, before the first processing module 620 reports the antenna-panel switching indication information to the base station, the first processing module 620 is further configured to,
    send a switching information configuration request to the base station;
    receive a configuration instruction sent by the base station according to the configuration request.

The reporting the antenna-panel switching indication information to the base station, includes:
    according to the configuration instruction, reporting the antenna-panel switching indication information to the base station.

Optionally, when obtaining the antenna-panel switching indication information indicated by the base station, the first determining module 610 is configured to,
    obtain the antenna-panel switching indication information sent by the base station through physical layer signaling or higher layer signaling; or,
    according to a target communication event triggered by the base station, obtain the antenna-panel switching indication information.

Optionally, the target communication event includes:
    one synchronization signal and PBCH block (SSB) beam transmission;
    downlink beam measurement reporting;
    beam failure reporting;
    sending beam failure recovery request;
    performing new beam reporting;
    performing uplink beam sweeping;
    sending content-based random access channel (RACH);
    performing downlink beam sweeping;
    using media access control control unit (MAC-CE) scheduled by downlink control information (DCI) to reconfigure signals;
    responding to downlink beam failure;
    receiving content-based RACH;
    triggering a RACH with no content.

Figure 7:
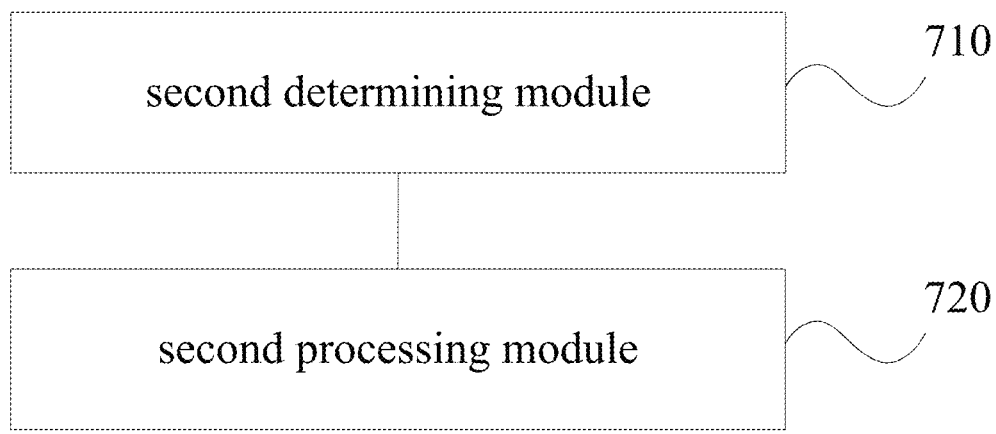
FIG. 7 is a schematic diagram of a device according to another embodiment of the present disclosure.

One embodiment of the present disclosure further provides a device for determining antenna-panel switching, which is applied to a base station. As shown in FIG. 7, the device includes:
    a second determining module 710 configured to determine antenna-panel switching indication information of user equipment;
    a second processing module 720 configured to determine, according to the antenna-panel switching indication information, whether the user equipment has performed antenna-panel switching.

Optionally, the antenna-panel switching indication information includes at least one of a time range, a switching point or an offset.

Optionally, in case that the antenna-panel switching indication information includes a time range, when determining, according to the antenna-panel switching indication information, whether the user equipment has performed antenna-panel switching, the second processing module 720 is configured to,
    determine that the user equipment does not perform antenna-panel switching within the time range indicated by the antenna-panel switching indication information.

Optionally, in case that the antenna-panel switching indication information includes a switching point, when determining, according to the antenna-panel switching indication information, whether the user equipment has performed antenna-panel switching, the second processing module 720 is configured to,
    determine whether the user equipment performs antenna-panel switching at the switching point indicated by the antenna-panel switching indication information.

Optionally, in case that the antenna-panel switching indication information includes an offset, when determining, according to the antenna-panel switching indication information, whether the user equipment has performed antenna-panel switching, the second processing module 720 is configured to,
    determine that when the user equipment detects a target event, the user equipment performs antenna-panel switching at a time point determined by adding the offset to a trigger time of the target event.

Optionally, the target event includes at least one of the following:
    target communication event;
    system timing arrives;
    the base station sends a first target signaling; or,
    the user equipment sends a second target signaling.

Optionally, the antenna-panel switching indication information may include multiple switching points which are periodic and/or aperiodic.

Optionally, when determining antenna-panel switching indication information, the second determining module 710 is configured to perform at least one of the following:
    obtaining the antenna-panel switching indication information reported by the user equipment;
    according to system predefined information, determining the antenna-panel switching indication information; or,
    determining, by the base station itself, the antenna-panel switching indication information.

Optionally, when obtaining the antenna-panel switching indication information reported by the user equipment, the second determining module 710 is configured to, obtain the antenna-panel switching indication information reported by the user equipment to the base station through an uplink channel or a triggered target communication event.

Optionally, before the second determining module 710 obtains the antenna-panel switching indication information reported by the user equipment, the second processing module 720 is configured to, obtain switching information configuration request sent by the user equipment;

in response to the switching information configuration request, send a configuration instruction to the user equipment.

The user equipment reports the antenna-panel switching indication information to the base station, according to the configuration instruction.

Optionally, after the second determining module 710 itself determines the antenna-panel switching indication information, the second processing module 720 is configured to, indicate the antenna-panel switching indication information to the user equipment.

Optionally, when indicating the antenna-panel switching indication information to the user equipment, the second processing module 720 is configured to, indicate the antenna-panel switching indication information to the user equipment through physical layer signaling or high layer signaling; or indicate the antenna-panel switching indication information to the user equipment by triggering a target communication event.

Optionally, the target communication event includes at least one of the following:

one synchronization signal and PBCH block (SSB) beam transmission;

downlink beam measurement reporting;

beam failure reporting;

sending beam failure recovery request;

performing new beam reporting;

performing uplink beam sweeping;

sending content-based random access channel (RACH);

performing downlink beam sweeping;

using media access control control unit (MAC-CE) scheduled by downlink control information (DCI) to reconfigure signals;

responding to downlink beam failure;

receiving content-based RACH; or, triggering a RACH with no content.

One embodiment of the present disclosure further provides a processor-readable storage medium, which includes a program stored thereon. The program is executed by a processor to implement various procedures of any one of the embodiments of the above method for determining antenna-panel switching, and the same technical effect can be achieved. To avoid repetition, details are not described here. The processor-readable storage medium is, for example, a read-only memory (ROM), a random access memory RAM), a magnetic disk, or an optical disk.

It should be noted that in this article, such terms "include" or "including" and any variations thereof are intended to cover non-exclusive inclusions. For example, a process, method, product or device that includes a series of elements, is not necessarily limited to those clearly listed elements, and may include other elements that are not clearly listed or are inherent to the process, method, product or device. Without further limitation, an element defined by the phrase "including a . . . " does not preclude presence of additional identical elements in a process, method, produce or device that includes the element.

The person skilled in this field may be aware that the units and algorithmic steps of each embodiment described in the embodiments of the present disclosure can be realized by electronic hardware or a combination of the electronic hardware and computer software. Whether these functions are performed with hardware or software depends on the specific application and design constraints of the technical solution. Professionals may use different methods for each particular application to implement the described function, but such implementations should not be considered as beyond the scope of this disclosure.

The technical personnel in the field can clearly understand that, for the convenience and simplicity of description, the specific working process of the system, device and unit described above may refer to the corresponding process in the above method embodiment, and it will not be repeated here.

In the embodiments provided in the present application, it should be understood that the disclosed device and method may be realized by other modes. For example, the device embodiment described above is only illustrative, for example, the units are divided according to the logical function and can be divided in other modes in fact. For instance, multiple units or components can be combined with or can be integrated into another system, or some characteristics can be ignored, or are not executed. On the other hand, the coupling or direct coupling or communication connection shown or discussed among each other may be indirect coupling or communication connection through some interfaces, devices or units, which may be electrical, mechanical or in other forms.

The units described above as separation units may or may not be physically separated, and the components displayed as the units may or may not be the physical units. The units can be located in one place or distributed to multiple network units. Partial or all of these units may be selected according to actual requirements to realize the purpose of the solutions in embodiments of the present disclosure.

Further, each function unit in each embodiment of the present disclosure may be integrated into one processing unit, each unit may be set in a separate physical location, or two or more than two units may be integrated into one unit.

From description of the above embodiments, those skilled in the art can clearly understand that the methods of the above embodiments may be implemented by means of software plus a necessary general hardware platform, and of course, may be implemented by hardware, but in many cases the former is better. On the basis of such an understanding, the technical scheme of the preset disclosure in essence or those contributing to the existing technology in embodiments of the present disclosure can be embodied in the form of software products. The computer software product may be stored in a storage medium, which may include several instructions to enable a computer device (which can be a personal computer, server, or network device, etc.) to perform all or partial of the method in each embodiment of the present disclosure.

Those skilled in the art can understand that all or part of the processes in the methods of the above embodiments can be implemented by controlling relevant hardware through a computer program, and the program may be stored in a computer-readable storage medium. When the program is executed, the processes in the methods of the above embodiments can be implemented. The storage medium may be a magnetic disk, an optical disk, a read-only memory (ROM), or a random access memory (RAM) or the like.

It can be understood that those embodiments described in the embodiments of the present disclosure may be implemented by hardware, software, firmware, middleware, microcode, or a combination thereof. For implementation with hardware, units, modules, sub-units and sub-modules may be implemented in one or more application specific integrated circuits (ASIC), a digital signal processor (DSP), a digital signal processing device (DSP Device, DSPD), a programmable logic device (PLD), a field-programmable gate array (PFGA), a general processor, a controller, a micro-controller, a microprocessor, another electronic unit for implementing the functions of the present disclosure, or their combinations.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

The embodiments of the present disclosure have been described above in conjunction with the accompanying drawings, but the present disclosure is not limited to the above specific embodiments, which are merely illustrative rather than restrictive. Under the inspiration of the present disclosure, without departing from the scope of the present disclosure and the protection scope of the claims, many variations may be made, which all fall within the protection of the present disclosure.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A method for determining antenna-panel switching, performed by user equipment, comprising:
   determining antenna-panel switching indication information; and
   performing antenna-panel switching according to the antenna-panel switching indication information;
   wherein the antenna-panel switching indication information includes at least one of a switching point or an offset:
   wherein the antenna-panel switching indication information includes at least two switching points, and the performing antenna-panel switching according to the antenna-panel switching indication information, includes: at each of the at least two switching points indicated by the antenna-panel switching indication information, performing antenna-panel switching;
   or,
   wherein the antenna-panel switching indication information includes the offset, and the performing antenna-panel switching according to the antenna-panel switching indication information, includes: when a target event is detected, at a time point determined by adding the offset to a trigger time of the target event, performing antenna-panel switching; wherein the target event includes at least one of the following:
   target communication event;
   system timing arrives;
   a base station sends a first target signaling; or,
   the user equipment sends a second target signaling.

2. The method according to claim 1, wherein the determining antenna-panel switching indication information, includes at least one of the following:
   obtaining the antenna-panel switching indication information indicated by a base station;
   according to system predefined information, determining the antenna-panel switching indication information; or,
   determining, by the user equipment itself, the antenna-panel switching indication information.

3. The method according to claim 2, wherein when the user equipment itself determines the antenna-panel switching indication information, the method further includes:
   reporting the antenna-panel switching indication information to the base station.

4. The method according to claim 3, wherein the reporting the antenna-panel switching indication information to the base station, includes: reporting the antenna-panel switching indication information to the base station, through an uplink channel or a triggered target communication event;
   or,
   wherein before the user equipment reports the antenna-panel switching indication information to the base station, the method further includes: sending a switching information configuration request to the base station, and receiving a configuration instruction sent by the base station according to the configuration request; wherein the reporting the antenna-panel switching indication information to the base station, includes: according to the configuration instruction, reporting the antenna-panel switching indication information to the base station.

5. The method according to claim 2, wherein the obtaining the antenna-panel switching indication information indicated by the base station, includes:
   obtaining the antenna-panel switching indication information sent by the base station through physical layer signaling or higher layer signaling; or,
   according to a target communication event triggered by the base station, obtaining the antenna-panel switching indication information; wherein the target communication event includes at least one of the following:
   one synchronization signal and PBCH block (SSB) beam transmission
   performing downlink beam measurement reporting;
   beam failure reporting;
   sending beam failure recovery request;
   performing new beam reporting;
   performing uplink beam sweeping;
   sending content-based random access channel (RACH);
   performing downlink beam sweeping;
   using media access control control unit (MAC-CE) scheduled by downlink control information (DCI) to reconfigure signals;
   responding to downlink beam failure;
   receiving content-based RACH; or,
   triggering a RACH with no content.

6. A method for determining antenna-panel switching, performed by a base station, comprising:
   determining antenna-panel switching indication information of user equipment;
   determining, according to the antenna-panel switching indication information, whether the user equipment has performed antenna-panel switching:
   wherein the antenna-panel switching indication information includes at least one of a switching point or an offset;

wherein the antenna-panel switching indication information includes at least two switching points, and the determining, according to the antenna-panel switching indication information, whether the user equipment has performed antenna-panel switching, includes: determining whether the user equipment performs antenna-panel switching at each of the at least two switching points indicated by the antenna-panel switching indication information;

or, wherein the antenna-panel switching indication information includes the offset, and the determining, according to the antenna-panel switching indication information, whether the user equipment has performed antenna-panel switching, includes: determining that when the user equipment detects a target event, the user equipment performs antenna-panel switching at a time point determined by adding the offset to a trigger time of the target event; wherein the target event includes at least one of the following:

target communication event;
system timing arrives;
the base station sends a first target signaling; or,
the user equipment sends a second target signaling.

7. The method according to claim 6, wherein the determining antenna-panel switching indication information, includes at least one of the following:

obtaining the antenna-panel switching indication information reported by the user equipment;

according to system predefined information, determining the antenna-panel switching indication information; or, determining, by the base station itself, the antenna-panel switching indication information.

8. The method according to claim 7, wherein the obtaining the antenna-panel switching indication information reported by the user equipment, includes: obtaining the antenna-panel switching indication information reported by the user equipment to the base station through an uplink channel or a triggered target communication event;

or, wherein before obtaining the antenna-panel switching indication information reported by the user equipment, the method further includes: obtaining switching information configuration request sent by the user equipment; in response to the switching information configuration request, sending a configuration instruction to the user equipment, so that the user equipment reports the antenna-panel switching indication information to the base station, according to the configuration instruction;

or, wherein after the base station itself determines the antenna-panel switching indication information, the method further includes: indicating the antenna-panel switching indication information to the user equipment.

9. The method according to claim 8, wherein the indicating the antenna-panel switching indication information to the user equipment, includes:

indicating the antenna-panel switching indication information to the user equipment through physical layer signaling or high layer signaling; or indicating the antenna-panel switching indication information to the user equipment by triggering a target communication event; wherein the target communication event includes at least one of the following:

one synchronization signal and PBCH block (SSB) beam transmission;

downlink beam measurement reporting;
beam failure reporting;
sending beam failure recovery request;
performing new beam reporting;
performing uplink beam sweeping;
sending content-based random access channel (RACH);
performing downlink beam sweeping;
using media access control control unit (MAC-CE) scheduled by downlink control information (DCI) to reconfigure signals;
responding to downlink beam failure;
receiving content-based RACH; or,
triggering a RACH with no content.

10. User equipment, comprising: a transceiver, a memory, a processor, and a program stored on the memory and executed by the processor; the processor is configured to, determine antenna-panel switching indication information; and perform antenna-panel switching according to the antenna-panel switching indication information;

wherein the antenna-panel switching indication information includes at least one of a switching point or an offset:

wherein the antenna-panel switching indication information includes at least two switching points; and when performing antenna-panel switching according to the antenna-panel switching indication information, the processor is configured to, at each of the at least two switching points indicated by the antenna-panel switching indication information, perform antenna-panel switching;

or, wherein the antenna-panel switching indication information includes the offset; and when performing antenna-panel switching according to the antenna-panel switching indication information, the processor is configured to, when a target event is detected, at a time point determined by adding the offset to a trigger time of the target event, perform antenna-panel switching; wherein the target event includes at least one of the following:

target communication event;
system timing arrives;
a base station sends a first target signaling; or,
the user equipment sends a second target signaling.

11. A base station for performing the method according to claim 6, comprising: a transceiver, a memory, a processor, and a program stored on the memory and executed by the processor; the processor is configured to, determine antenna-panel switching indication information of user equipment;

determine, according to the antenna-panel switching indication information, whether the user equipment has performed antenna-panel switching;

wherein the antenna-panel switching indication information includes at least one of a switching point or an offset;

wherein the antenna-panel switching indication information includes at least two switching points; and when determining, according to the antenna-panel switching indication information, whether the user equipment has performed antenna-panel switching, the processor is configured to determine whether the user equipment performs antenna-panel switching at each of the at least two switching points indicated by the antenna-panel switching indication information;

or, wherein the antenna-panel switching indication information includes the offset; and when determining, according to the antenna-panel switching indication information, whether the user equipment has performed antenna-panel switching, the processor is configured to determine that when the user equipment detects a target event, the user equipment performs antenna-panel switching at a time point determined by adding the offset to a trigger time of the target event; wherein the target event includes at least one of the following:

target communication event;

system timing arrives;

the base station sends a first target signaling; or, the user equipment sends a second target signaling.

* * * * *